United States Patent
Lv et al.

(10) Patent No.: US 11,274,766 B2
(45) Date of Patent: Mar. 15, 2022

(54) ELECTRICAL VALVE

(71) Applicant: Zhejiang Sanhua Climate and Appliance Controls Group Co., Ltd., Zhejiang (CN)

(72) Inventors: Ming Lv, Zhejiang (CN); Jiancheng Zhi, Zhejiang (CN); Damai Yang, Zhejiang (CN)

(73) Assignee: ZHEJIANG SANHUA CLIMATE AND APPLIANCE CONTROLS GROUP CO., LTD., Zhejiang (CN)

( * ) Notice: Subject to any disclaimer, the term of this patent is extended or adjusted under 35 U.S.C. 154(b) by 0 days.

(21) Appl. No.: 16/758,647

(22) PCT Filed: Apr. 19, 2018

(86) PCT No.: PCT/CN2018/083725
§ 371 (c)(1),
(2) Date: Apr. 23, 2020

(87) PCT Pub. No.: WO2019/080463
PCT Pub. Date: May 2, 2019

(65) Prior Publication Data
US 2020/0347952 A1 Nov. 5, 2020

(30) Foreign Application Priority Data
Oct. 27, 2017 (CN) .......................... 201711019478.9

(51) Int. Cl.
*F16K 31/04* (2006.01)
*F25B 41/31* (2021.01)
(Continued)

(52) U.S. Cl.
CPC ............. *F16K 31/04* (2013.01); *F25B 41/31* (2021.01); *F16K 1/36* (2013.01); *F25B 41/20* (2021.01)

(58) Field of Classification Search
CPC ............. F16K 1/42; F16K 31/04; F25B 41/31
See application file for complete search history.

(56) References Cited

U.S. PATENT DOCUMENTS 6,997,440 B2 * 2/2006 Tutt .......................... F16K 7/14
251/331
2004/0075072 A1 4/2004 Lanting et al.
(Continued)

FOREIGN PATENT DOCUMENTS

CN 105090534 A 3/2005
CN 2699067 Y 5/2005
(Continued)

OTHER PUBLICATIONS

International Search Report dated May 25, 2018 for PCT application No. PCT/CN2018/083725.
(Continued)

*Primary Examiner* — Eric Keasel
(74) *Attorney, Agent, or Firm* — Ohlandt, Greeley, Ruggiero and Perle, LLP

(57) ABSTRACT

An electrical valve, comprising: a valve body component, the valve body component comprising a valve body and a valve cover body, the valve cover body being fixedly connected to the valve body; a valve seat component, the valve seat component comprising a valve seat body and a valve seat core, the valve seat body being fixedly connected to the valve body, the valve seat core being sleeved with a valve port protective sleeve. Due to a structurally optimised design, the electrical valve has a compact overall structure and a small size, and the positional accuracy between various functional parts is easily ensured, thereby increasing the reliability of the valve seat core.

17 Claims, 10 Drawing Sheets

(51) Int. Cl.
*F16K 1/36* (2006.01)
*F25B 41/20* (2021.01)

(56) References Cited

U.S. PATENT DOCUMENTS

| | | |
|---|---|---|
| 2007/0040138 A1 | 2/2007 | Sekiya et al. |
| 2007/0145321 A1 | 6/2007 | Lowery |
| 2014/0091246 A1 | 4/2014 | Lv et al. |
| 2015/0136260 A1 | 5/2015 | Zhan |
| 2015/0316168 A1 | 11/2015 | Lv |
| 2016/0115845 A1 | 4/2016 | Fujita et al. |
| 2016/0195195 A1* | 7/2016 | Lv .................. F16K 31/047 251/129.11 |

FOREIGN PATENT DOCUMENTS

| | | |
|---|---|---|
| CN | 102588620 A | 7/2012 |
| CN | 103629388 A | 3/2014 |
| CN | 104791502 A | 7/2015 |
| CN | 104791544 A | 7/2015 |
| DE | 102008059025 A1 | 6/2010 |
| EP | 1450083 A1 | 8/2004 |
| EP | 2725267 A1 | 4/2014 |
| FR | 2742206 A1 | 6/1997 |
| JP | 2001343083 A | 12/2001 |
| JP | 2003074730 A | 3/2003 |
| JP | 2005069366 A | 3/2005 |
| JP | 2006153204 A | 6/2006 |
| JP | 2009522517 A | 6/2009 |
| JP | 201174587 A | 9/2011 |
| JP | 2011174587 A | 9/2011 |
| JP | 2015086996 A | 5/2015 |
| JP | 2016505777 A | 2/2016 |
| JP | 2017161051 A | 9/2017 |
| WO | 2004072523 A1 | 8/2004 |

OTHER PUBLICATIONS

Chinese Office Action dated Oct. 11, 2019 for Chinese Patent Appl. No. 201711019478.9.
Chinese Office Action dated Oct. 12, 2020 for Chinese Patent Appl. No. 201711019478.9.
European Search Report dated Jul. 7, 2021 for European Appl. No. 18869926.8.
Japanese Office Action dated Jun. 8, 2021 for Japanese Appl. No. 2020-523341.

* cited by examiner

ELECTRICAL VALVE

The present application is the national phase of International Application No. PCT/CN2018/083725, entitled "ELECTRICAL VALVE," filed on Apr. 19, 2018, which claims the priority to Chinese patent application No. 201711019478.9, titled "ELECTRIC VALVE", filed with the China National Intellectual Property Administration on Oct. 27, 2017, which are incorporated herein by reference in their entireties.

BACKGROUND

1. Field of the Disclosure

The present application relates to the technical field of fluid control, and in particular to an electric valve.

2. Discussion of the Background Art

In commercial air-conditioning systems, such as the variable refrigerant flow system, one outdoor unit is required to be connected with multiple indoor units; therefore, a flow control valve is required to be mounted in a refrigerant loop of each indoor unit for cutting off the refrigerant or regulating the flow. The flow control valve is required to be capable of regulating the flow and the opening to any degree and operating stably. Further, since the flow control valve is required to be mounted in the refrigerant loop of each indoor unit, the flow control valve is further required to meet the requirements of minimization and large capacity.

At present, in order to precisely regulate the flow of the refrigerant, a direct-acting electric valve may be used. However, in the variable refrigerant flow commercial air conditioner, a valve port area of the flow control valve is relatively large, and the needed driving force is also relatively large. In order to obtain a large driving force, the size of the driving system of the valve needs to be increased, thereby increasing the overall size of the flow control valve. However, since the environment-friendly new refrigerants (such as R290, R32 and the like) used in recent years are flammable and explosive, there is a limit on the refrigerant charge of the valve, and the refrigerant charge needs to be controlled within a certain volume.

In view of this, a technical problem to be solved urgently by those skilled in the art is how to optimize the design of the direct-acting electric valve in the conventional technology, reduce the size of the valve body, and better apply the electric valve to commercial models such as the variable refrigerant flow model or the like.

SUMMARY

An object of the present application is to provide an electric valve. By optimizing the design of the product structure, the volume of the electric valve is reduced and the reliability of the electric valve is increased, the use requirements of commercial air conditioners such as variable refrigerant flow conditioners are met, and the manufacturing cost of the product can be reduced.

The electric valve disclosed by the present application includes a valve body component, wherein the valve body component includes a valve body and a valve cover, and the valve cover is fixedly connected with the valve body; a valve core component, which is arranged inside an inner chamber of the valve body; a transmission component; and a valve seat component, wherein the valve seat component includes a valve seat body and a valve seat core, the valve seat body is fixedly connected with the valve body, and the valve seat core is sleeved outside a valve port jacket.

The electric valve according to the present application has a compact overall structure and a small size through the optimized design of the structure. The position accuracy between various functional parts is easy to guarantee, and the reliability of the valve seat core is improved by sleeving the valve port jacket outside the valve seat core.

Figure 1:
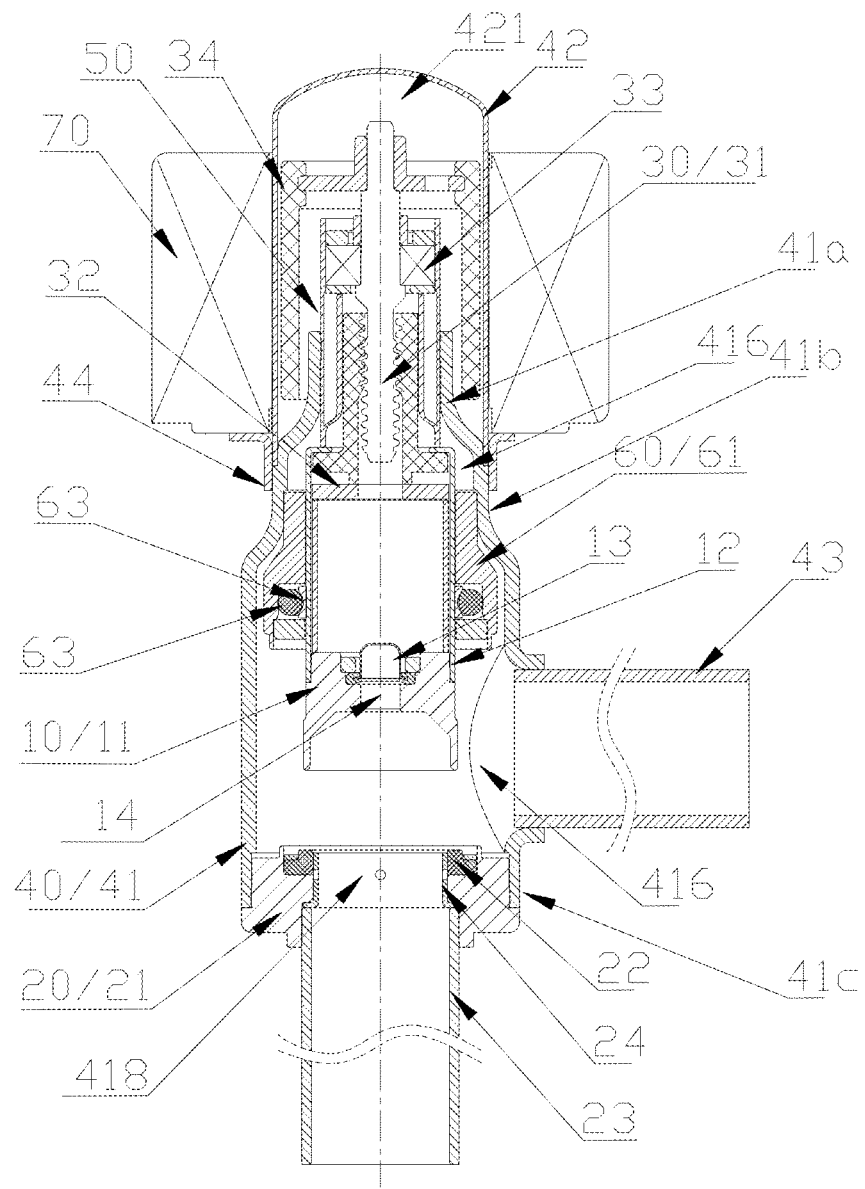
FIG. 1 is a schematic structural view of an electric valve according to an embodiment of the present application in a fully open state.

Reference numerals in FIGS. 1 to 19:

| | | |
|---|---|---|
| 10/10A valve core component | 11 valve core body, | 12 valve core sleeve, |
| 13 filter member, | 14 balance passage, | 15 valve core head, |
| 20/20A/20B valve seat component | | 21/21A/21B valve seat body |
| 211 upper stepped portion, | | 212 lower stepped portion, |
| 213 outer stepped portion, | | 214 protrusion portion, |
| 215 conical surface, | | 22/22A valve seat core, |
| 221 groove, | 222 upper end portion, | 223 sealing portion |
| 23 axial connecting pipe, | | 24/24A/24B/24C/24D valve port jacket |
| 241 balance aperture/passage, | | 243 cylinder portion, |
| 244 flange portion, | | 245 V-shaped groove, |
| 25 valve port pressing ring, | | 30 transmission component, |
| 31 screw rod, | 32 screw nut, | 33 bearing, |
| 34 magnetic rotor, | | 40 valve body component, |
| 41 valve body, | | 411 first mating portion, |
| 412 second mating portion, | | 413 third mating portion, |
| 414 fourth mating portion, | | 415 fifth mating portion, |
| 416 inner chamber of the valve body, | | 417 communication aperture, |
| 418 valve chamber, | | 41a upper cylinder portion, |
| 41b middle cylinder portion, | | 41c lower cylinder portion, |
| 42 valve cover, | | 421 inner chamber of the valve cover, |
| 43 radial connecting pipe, | | 44 bracket, |
| 50/50A/50B screw nut kit, | | 51 first limiting portion, |
| 52 second limiting portion, | | 53 bearing accommodating portion, |
| 54 outer circumferential portion, | | 55 tubular portion, |
| 56 flat plate portion, | | 57 radial ribbed plate, |
| 58 plane section, | | 60 valve core guiding component, |
| 61 guide sleeve, | | 611 stepped portion, |
| 62 sealing member, | | 63 elastic member, |
| 64 gasket, | | 65 guide surface, |
| 70 electromagnetic coil. | | |

DETAILED DESCRIPTION OF THE EMBODIMENTS

A core of the present application is to provide an electric valve and a method for manufacturing the same. The electric valve has a compact structure and is easy to manufacture, the position precision between various functional parts thereof is easy to guarantee, and the product reliability is high. Another core of the present application is to provide a method for manufacturing the electric valve.

In order to provide those skilled in the art with a better understanding of the solutions of the present application, the present application will be described hereinafter in further detail in conjunction with the drawings and specific embodiments.

It should be noted that, the orientation terms, such as upper and lower, involved in this application are defined with reference to the positions of the components in the figures and the relative positions of the components as shown in FIGS. 1 to 17, which are only for clarity and ease of describing the technical solutions. It will be appreciated that, those orientations terms used herein do not limit the protection scope of the present application.

Figure 2:
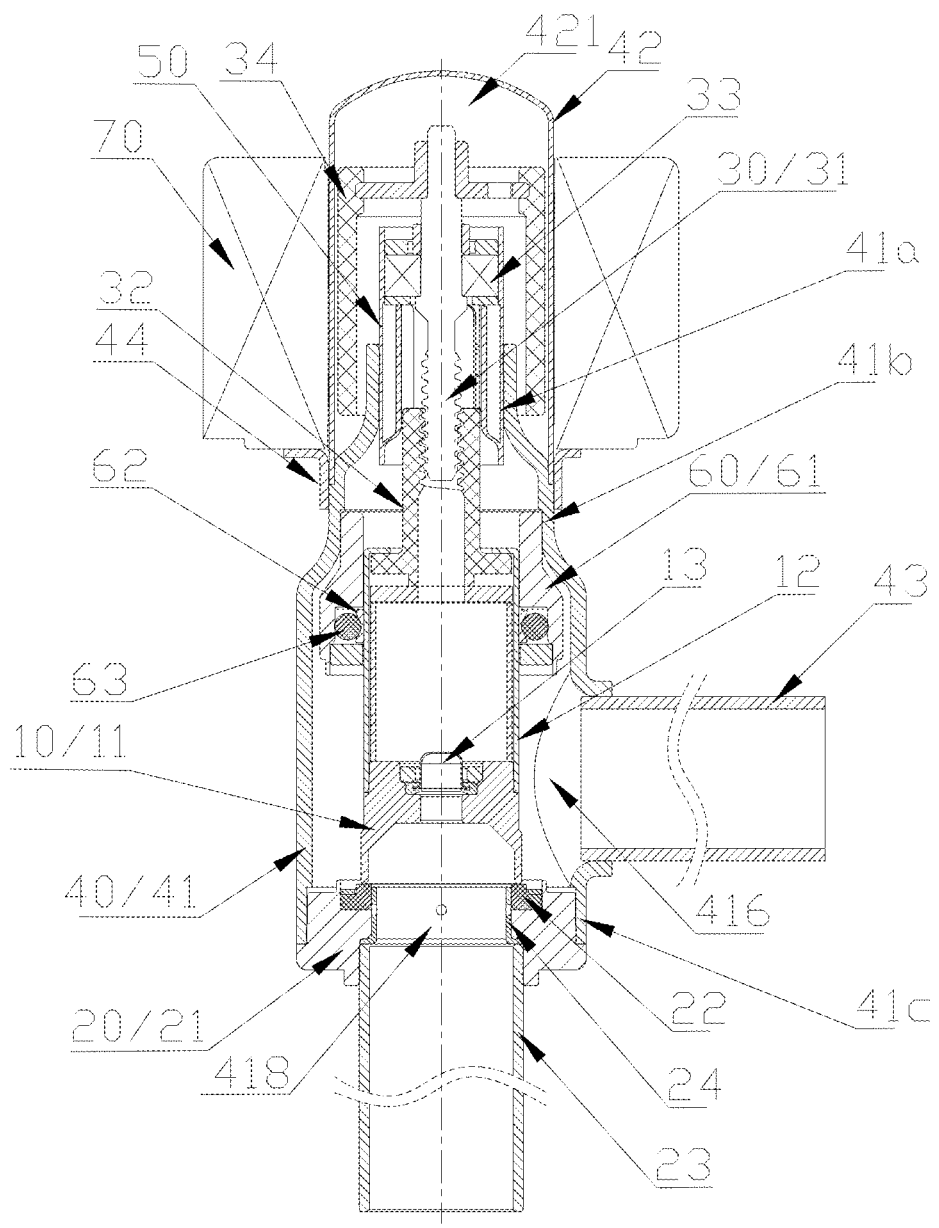
FIG. 2 is schematic structural view of the electric valve shown in FIG. 1 in a closed state.
Figure 3:
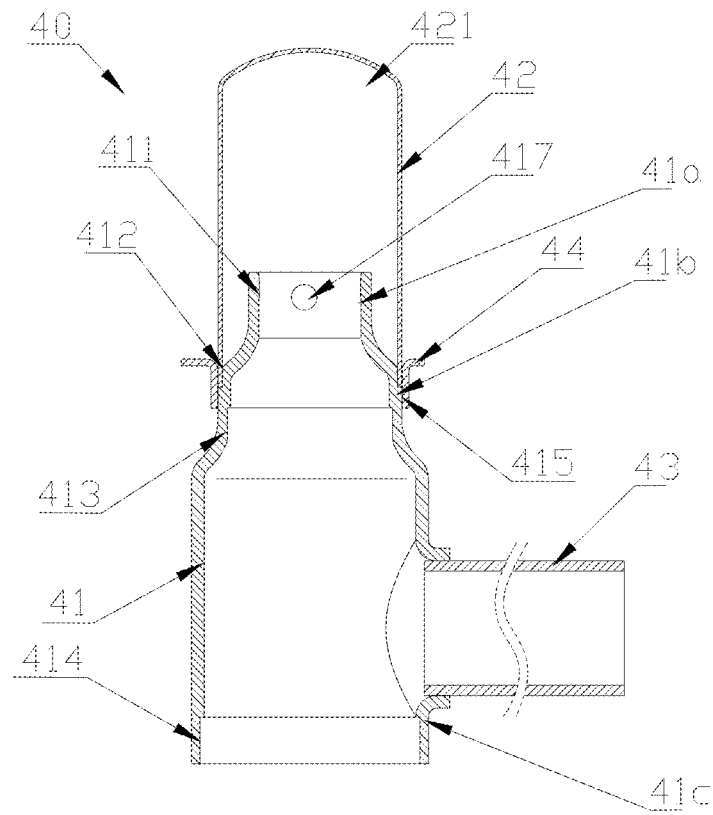
FIG. 3 is a schematic structural view of a valve body component of the electric valve shown in FIG. 1.
Figure 4:
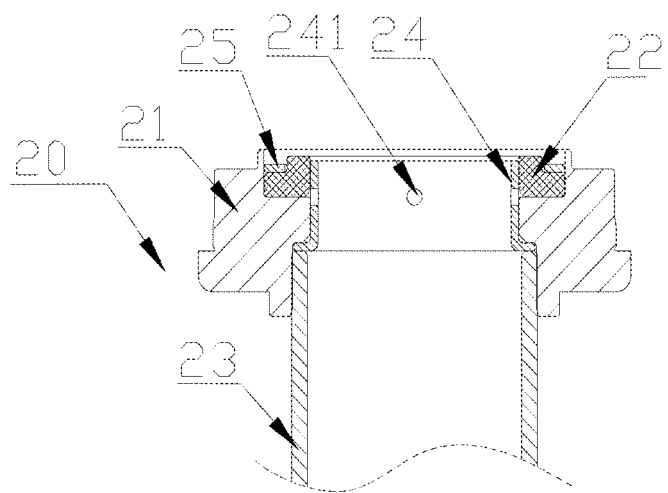
FIG. 4 is a schematic structural view of a valve seat component of the electric valve shown in FIG. 1.
Figure 5:
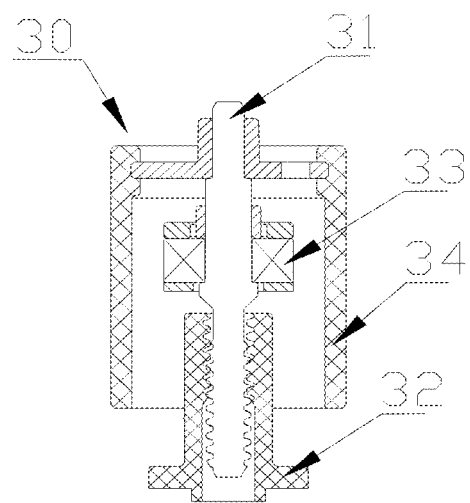
FIG. 5 is a schematic structural view of a transmission component of the electric valve shown in FIG. 1.
Figure 6:
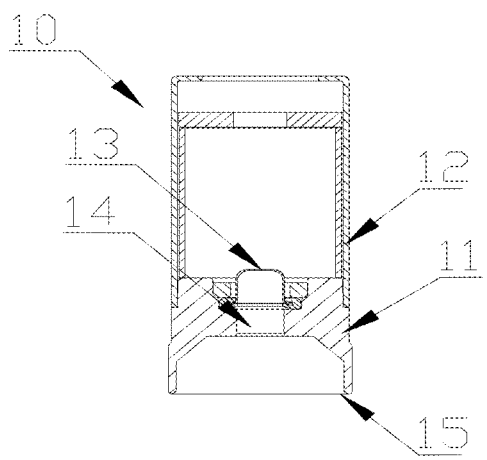
FIG. 6 is a schematic structural view of a valve core component of the electric valve shown in FIG. 1.
Figure 7:
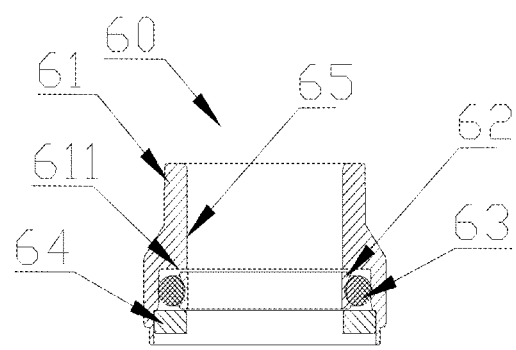
FIG. 7 is a schematic structural view of a valve core guiding component of the electric valve shown in FIG. 1.
Figure 8:
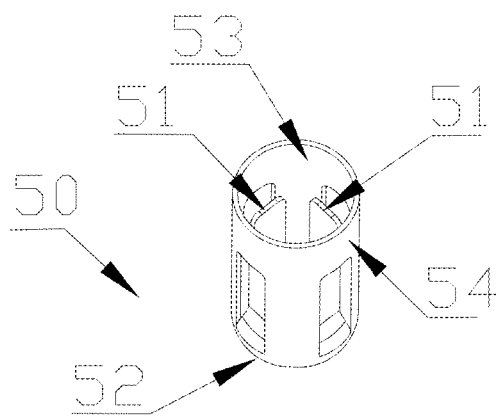
FIG. 8 is a schematic structural view of a screw nut kit of the electric valve shown in FIG. 1.

FIG. 1 is a schematic structural view of the electric valve according to the present application in an open state; FIG. 2 is a schematic structural view of the electric valve according to the present application in a closed state; FIG. 3 is a schematic structural view of a valve body component of the electric valve; FIG. 4 is a schematic structural view of a valve seat component of the electric valve; FIG. 5 is a schematic structural view of a transmission component of the electric valve; FIG. 6 is a schematic structural view of a valve core component of the electric valve; FIG. 7 is a schematic structural view of a valve core guiding component of the electric valve; and FIG. 8 is a schematic structural view of a screw nut kit of the electric valve.

As shown in FIGS. 1 to 8, the electric valve includes a valve core component 10, a valve seat component 20, a transmission component 30, a valve body component 40, a screw nut kit 50, a valve core guiding component 60 and an electromagnetic coil 70.

The valve body component 40 includes a valve body 41 and a valve cover 42.

The valve body 41 is a substantially cylindrical structure, which is easy to manufacture in a specific processing process by methods such as pressing, punching, rolling, extrusion shaping or the like. The valve body 41 includes an upper cylinder portion 41a, a middle cylinder portion 41b and a lower cylinder portion 41c.

Figure 15:
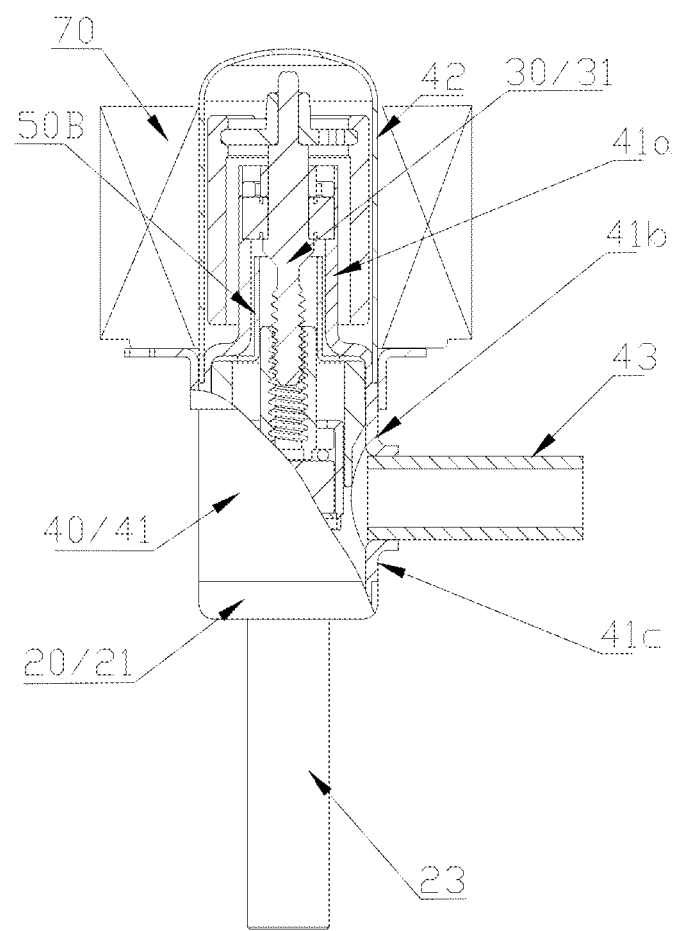
FIG. 15 is a schematic structural view of another embodiment of the electric valve according to the present application.

In the embodiment according to FIGS. 1 and 2, a diameter of an outer margin of the upper cylinder portion 41a is the smallest in the three cylinder portion structures, and the diameter of outer margin of the lower cylinder portion 41c is the largest. Such an arrangement facilitates internal installation of functional parts and external welding of assembly parts, which makes the structure more compact. FIG. 15 is a schematic structural view of another embodiment of the electric valve according to the present application. In the technical solution disclosed by FIG. 15, the diameter of the outer margin of the middle cylinder portion 41b is the same as that of the lower cylinder portion 41c.

A radial connecting pipe 43 is fixed to the lower cylinder portion 41c of the valve body 41 by welding, and the radial connecting pipe 43 is in communication with an inner chamber 416 of the valve body 41. The valve cover 42 is fixed to the middle cylinder portion 41b of the valve body 41 by welding, an inner chamber 421 of the valve cover 42 is formed between the valve body 41 and the valve cover 42, and the upper cylinder portion 41a of the valve body 41 is extended into the inner chamber 421 of the valve cover 42. A communication aperture 417 is provided in a wall portion of the upper cylinder portion 41a of the valve body 41, and the communication aperture 417 is configured to communicate the inner chamber 421 of the valve cover 42 with the inner chamber 416 of the valve body 41. It will be appreciated that, the valve cover 42 may be indirectly fixed to the valve body 41 by a welding joint. The welding of other components below may also be replaced by other indirect fixing means, which will not be repeated herein.

The valve seat component 20 includes a valve seat body 21, a valve seat core 22 and a valve port jacket 24.

Figure 9:
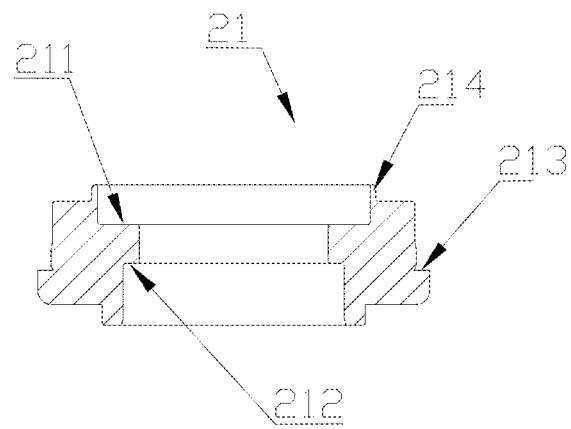
FIG. 9 is a schematic structural view of a valve seat body of the valve seat component shown in FIG. 4.

FIG. 9 is a schematic structural view of the valve seat body 21 of the valve seat component. As shown in FIG. 9, the valve seat body 21 is substantially an annular structure, an upper stepped portion 211 is provided on an inner wall of the valve seat body 21 with a stepped surface facing an upper end portion of the valve seat body 21, the valve seat core 22 is arranged on the upper stepped portion 211, and an inner wall surface of the valve seat core 22 is nested with the valve port jacket 24.

The valve seat core 22 may be made of a non-metallic soft material to improve the sealing performance of a valve port. A stepped portion is provided on an outer wall of the valve seat core 22, a valve port pressing sheet 25 is arranged on the stepped portion, and a protrusion portion 214 is provided on the upper end portion of the valve seat body 21. The valve port pressing sheet 25 is pressed against the stepped portion of the valve seat core 22 by crimping the protrusion portion 214, thereby realizing the installation of the valve seat core 22.

Figure 17:
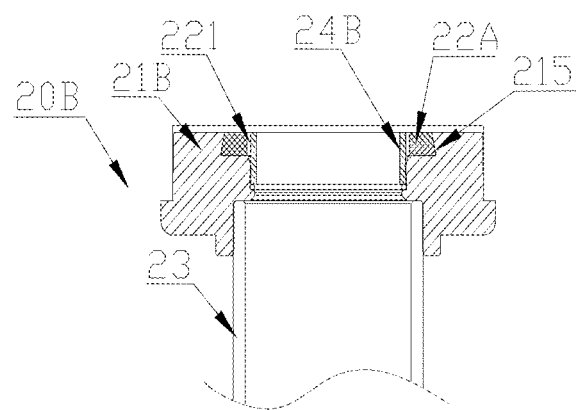
FIG. 17 is a schematic structural view of a third embodiment of the valve seat component according to the present application.

FIG. 17 is a schematic structural view of a third embodiment of the valve seat component according to the present application. In the present embodiment, an inner margin surface of the upper stepped portion of the valve seat body 21 of a valve seat component 20B is a conical surface 215 which tapers upwardly, a valve seat core 22A is made of a plastic or rubber soft material, and an outer margin of the valve seat core abuts against the conical surface 215 (the inner margin surface), also realizing fixation.

A lower stepped portion 212 with a stepped surface facing a lower end portion of the valve seat body 21 is provided on the inner wall of the valve seat body 21. In the present embodiment, the valve port jacket 24 is an annular thin-walled cylinder, which includes a cylinder portion 243 and a flange portion 244 formed by flanging. The flange portion 244 abuts against the stepped surface of the lower stepped portion 212, and an end portion of an axial connecting pipe 23 abuts against the flange portion 244. The axial connecting pipe 23 is fixed with the valve seat body 21 by welding.

As another technical solution, the valve port jacket 24 may be a two-body structure, that is, the cylinder portion 243 is fixedly connected with the flange portion 244 by welding or the like.

An outer stepped portion 213 with a stepped surface facing the lower end portion of the valve seat body 21 is provided on the outer wall of the valve seat body 21. As a preferred solution, a lower end portion of the valve body 41 abuts against the stepped surface of the outer stepped portion 213 and is fixed by welding.

In the above structures, the installation and cooperation of the parts is compact, the mutual position accuracy can be guaranteed, the process is simple, and the product is highly reliable. Since a magnetic rotor of the transmission component is arranged in the inner chamber of the valve cover, a screw rod is extended from an end portion of the upper cylinder portion of the valve body into the inner chamber of the valve body. During the axial movement of the valve core component with respect to the valve seat component, axial positions of the magnetic rotor and the screw rod are fixed with respect to the valve body 41, so that the relative position between the magnetic rotor and a coil component sleeved outside the electric valve is fixed, and the driving force is increased and relatively stable during the operation.

Figure 10:
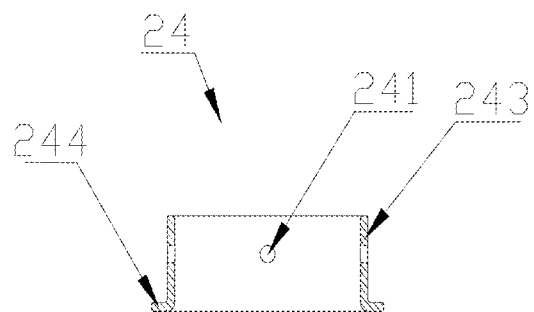
FIG. 10 is a schematic structural view of a valve port jacket of the valve seat component shown in FIG. 4.

FIG. 10 is a schematic structural view of the valve port jacket of the valve seat component. As shown in FIG. 10, in the present embodiment, a balance aperture in communication with an inner chamber of the valve port jacket 24 is arranged at a position of the cylinder portion of the valve port jacket 24 corresponding to the stepped surface of the upper stepped portion 211, and is used as a balance passage 241. Such an arrangement is advantageous in that, during the operation of the electric valve, part of the medium enters and remains between a bottom of the valve seat core 22 and the stepped surface of the upper stepped portion 211 of the valve seat body 21, and when the electric valve is opened or closed, abnormal fluctuations such as instantaneous vaporization of the medium due to the instantaneous pressure change may cause the valve seat core 22 to detach from the valve seat body 21, resulting in product failure, while an object of providing the balance aperture 241 is to keep the medium at the bottom of the valve seat core 22 in communication with an inner chamber (that is, the valve chamber 418) of the axial connecting pipe 23 to avoid the above situation.

Figure 11A:
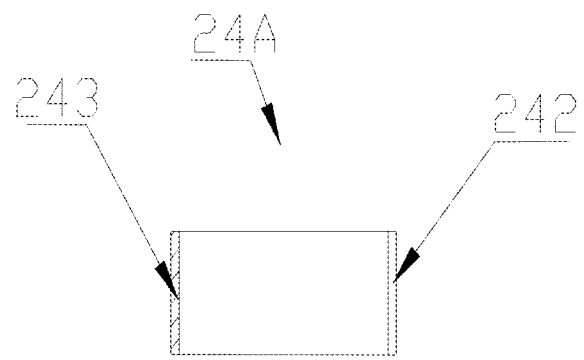
FIGS. 11a and 11b are a front view and a top view of another specific embodiment of the valve port jacket.
Figure 11B:
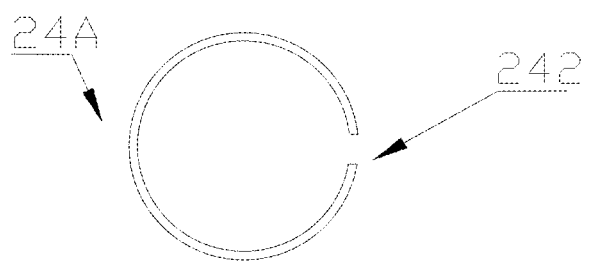
Figure 12:
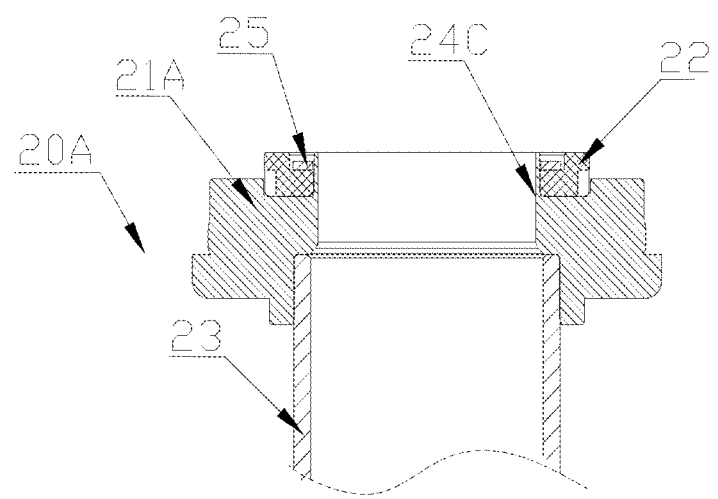
FIG. 12 is a schematic structural view of another embodiment of the valve seat component according to the present application.
Figure 13:
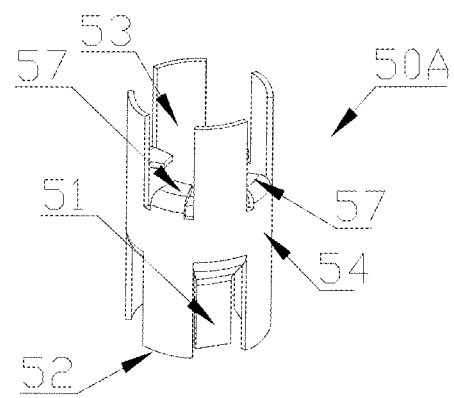
FIG. 13 is a schematic structural view of another embodiment of the screw nut kit according to the present application.

FIG. 11 shows a front view and a top view of another specific embodiment of the valve port jacket.

Reference is made to FIG. 11. Different from the above embodiment, a valve port jacket 24A is an annular thin-walled member formed by crimping a thin metal sheet. An opening groove 242 which is through in an axial direction is formed at a butt portion of the crimping of the thin metal sheet, and is used as the balance passage, to keep the medium at the bottom of the valve seat core 22 in communication with the inner chamber of the axial connecting pipe 23. Such a structure is simpler and will not be repeated herein.

In the above embodiments, the valve port jacket is a cylindrical structure formed by crimping the thin-walled metal material. The technical solution may be further developed with reference to FIG. 12, where the valve port jacket 24C is a one-piece structure directly processed by the inner wall of the valve seat body 21. In the present embodiment, the upper stepped portion of the valve seat body 21 forms an annular groove together with the valve port jacket 24C with the one-piece structure, and the valve seat core 22 is arranged in the annular groove. In the present embodiment, an axial balance groove is arranged between the valve seat core 22 and the stepped side wall of the valve seat body 21, and the balance groove can also keep the medium at the bottom of the valve seat core 22 in communication with an upper portion, which will not be repeated herein.

Referring to FIG. 17, in the structure of a third embodiment of the valve seat component 20B, a vertical groove 221 is arranged on an inner margin portion of the valve seat core 22A, the vertical groove 221 is in communication with the stepped surface of the upper stepped portion, and can also function as the balance aperture, which will not be repeated herein.

The transmission component 30 includes a screw rod 31, a screw nut 32 and a magnetic rotor 34. The magnetic rotor 34 is arranged inside the inner chamber of the valve cover 42, and the screw rod 31 is extended from the upper end portion of the valve body 41 into the inner chamber of the valve body 41 and cooperates with the screw nut 32.

The screw nut kit 50 is fixedly connected to an inner margin (distinguished from the present embodiment, in FIGS. 15 and 16, the screw nut kit is fixedly connected to an inner margin of the middle cylinder portion 41b of the valve body 41 by welding of a flat plate portion) of the upper cylinder portion 41a of the valve body 41 by welding of a pipe wall portion.

Referring to FIG. 8, in the present embodiment, the screw nut kit 50 is a thin-walled metal cylinder, which may be formed by sheet punching and crimping. In the present embodiment, the screw nut kit has four ribbed plates 51 axially extending and formed by punching and bending the side wall of the thin-walled cylinder inwardly. The ribbed plate 51 serves as a first limiting portion, where an inner wall thereof cooperates with an outer margin portion of the screw nut 32, and can limit the rotation of the screw nut 32 in a circumferential direction (it will be appreciated that, if only two ribbed plates are provided, the limiting function still works). A region 53 is formed between an upper end surface of the ribbed plate 51 and an inner wall surface of the screw nut kit, which can be used as an accommodating portion of a bearing 33 cooperating with the screw rod 31. The bearing 33 abuts against an upper end portion of the ribbed plate 51, realizing axial positioning of the bearing 33. The bearing 33 is fixed by crimping the upper end portion of the valve body 41.

In the above embodiments, the screw nut kit 50 is a cylindrical kit formed by metal sheet punching and crimping. The technical solution may be further developed with reference to FIG. 13, where, a screw nut kit 50A is a cylindrical kit formed by metal sheet punching and crimping, and when a lower section of the pipe wall portion is punched and bent inwardly to form the ribbed plate 51 extending axially, an upper section of the pipe wall portion is punched and bent inwardly to form a radial ribbed plate 57, a region between the radial ribbed plate 57 and the inner wall surface of the screw nut kit is used as the accommodating portion of the bearing 33, the radial ribbed plate 57 is used as an axial positioning portion of the bearing 32, and a lower end portion 52 of the screw nut kit is used as a second limiting portion to limit an axial movement stroke of the valve core component.

Figure 14:
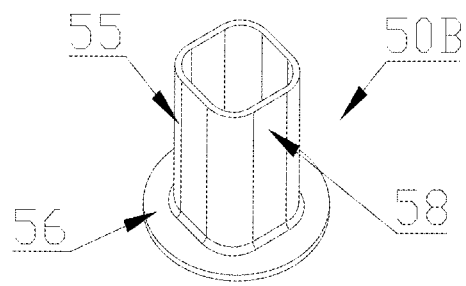
FIG. 14 is a schematic structural view of a third embodiment of the screw nut kit according to the present application.

Similarly, the technical solution may be further developed with reference to FIG. 14, where, a screw nut kit 50B is formed by metal sheet punching and crimping, which includes a tubular portion 55 and a flat plate portion 56 formed by bending an end portion of the tubular portion 55; and the tubular portion includes at least one axial plane section 58. Due to the existence of the plane section 58, the inner wall portion of the tubular portion cooperates with the outer margin portion of the screw nut 32 to limit the circumferential rotation of the screw nut 32. The flat plate portion 56 is used as the second limiting portion. In the present technical solution, the flat plate portion 56 may be formed by punching and flanging, or may be formed by welding another ring member.

In the present embodiment, the whole structure is simple by welding the flat plate portion 56 of the screw nut kit 50B to the inner margin of the middle cylinder portion 41b of the valve body 41.

In the present embodiment, the valve core guiding component 60 includes a guide sleeve 61 and a sealing assembly. The guide sleeve 61 is fixed to the inner margin of the middle cylinder portion 41b of the valve body 41 by welding. A stepped portion 611 is provided on an inner wall of the guide sleeve 61, and the sealing assembly is fixed to the stepped portion 611 by crimping via a gasket 64. The sealing assembly includes a sealing member 62 made of abrasion-resistant material and an elastic member 63 made of rubber material.

Figure 16:
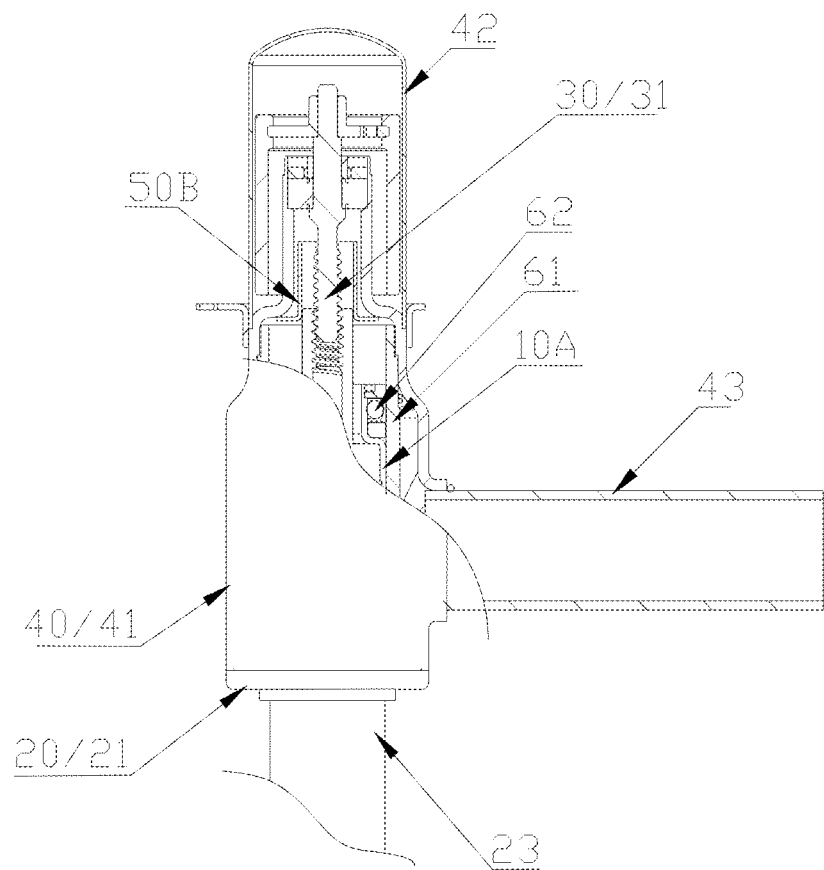
FIG. 16 is a schematic structural view of a third embodiment of the electric valve according to the present application.

FIG. 16 is a schematic structural view of a third embodiment of the electric valve according to the present application. Compared with the preceding solutions, the sealing assembly in the present embodiment is fixed on the valve core component 10A, which has the same function and will not be repeated herein.

The valve core component 10 is arranged inside the inner chamber 416 of the valve body 41. The valve core component 10 includes a valve core body 11 and a valve core sleeve 12 (the valve core body and the valve core sleeve may be a one-piece material molding structure). The screw nut 32 is connected with the valve core sleeve 12 to drive the valve core body 11 to move relative to the valve seat core 22, and to realize the opening/closing of the electric valve and regulation of the flow.

The lower end portion 52 of the screw nut kit is used as a limiting portion for the valve core component 10. While the screw nut 32 drives the valve core sleeve 12 to move upward, the valve core sleeve 12 may abut against the lower end portion 52 of the screw nut kit to limit the axial movement stroke of the valve core component 10. In a large-flow electric valve, the screw rod is connected with the screw nut by a non-self-locking thread, which is advantageous in that, hidden danger such as stuck is avoided after the valve core component 10 is limited.

The inner wall 65 of the guide sleeve 61 serves as a guide surface and is in a clearance-fit with the valve core sleeve 12, and the sealing member 62 is arranged between the valve core sleeve 12 and the guide sleeve 61. The inner wall 65 of the guide sleeve 61 is in a clearance-fit with an outer wall of the valve core sleeve 12.

The valve core body 11 is substantially a cylindrical structure, a lower end thereof is an annular valve core head 15, and the valve core head 15 cooperates with the valve seat core 22. The annular-valve-port sealing cooperation can make an abutting area between the valve core head 15 and the valve seat core 22 relatively small and improve the flexibility of the valve core, while increasing the flow of the valve port, which is especially suitable for commercial refrigeration systems.

The valve core body 11 is further provided with a though hole 14 which is through in the axial direction as the balance passage, and a filter member 13 is further arranged in the middle of the through hole 14. The communication aperture 417 is provided in the wall portion of the upper cylinder portion 41a of the valve body 41. The through hole 14 is combined with the communication aperture 417 to form a passage. The passage communicates the inner chamber of the valve cover 42 with the valve chamber 418 (a space of the valve port in communication with the connecting pipe).

Figure 18:
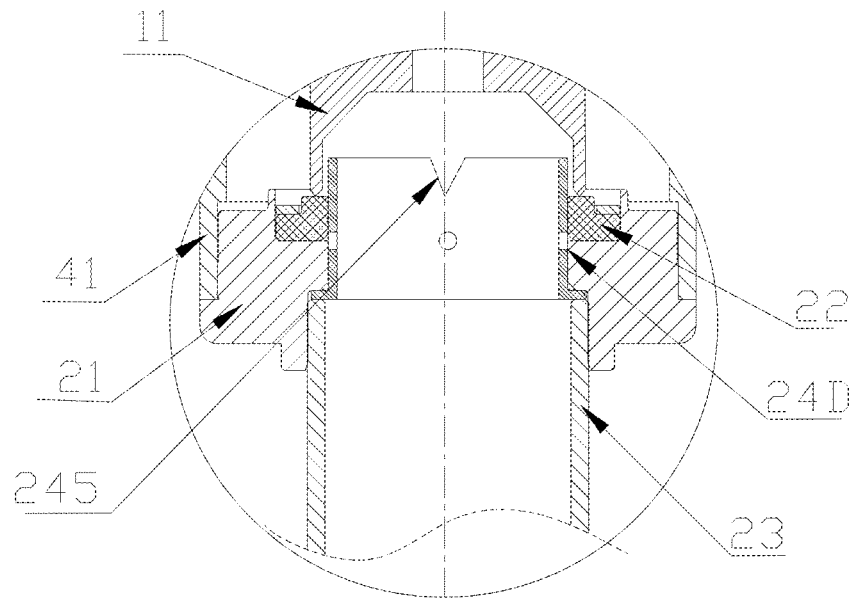
FIG. 18 is a schematic partial view of a fourth embodiment of the electric valve according to the present application.
Figure 19:
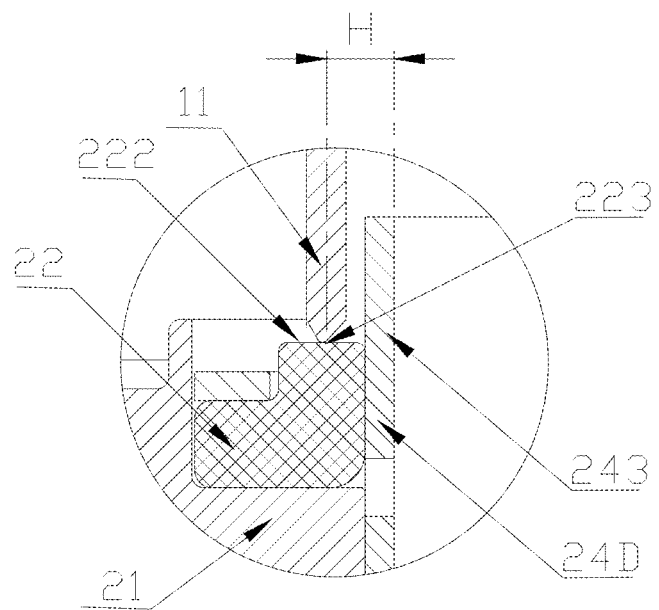
FIG. 19 is a partial enlarged view of a matching portion of the valve seat core and the valve core body shown in FIG. 18.

FIG. 18 is a schematic partial view of a fourth embodiment of the electric valve according to the present application, and FIG. 19 is a partial enlarged view of a matching portion of the valve seat core and the valve core body.

As shown in FIGS. 18 and 19, in the present embodiment, a valve port jacket 24D includes an upper end portion 222 higher than the valve seat core 22 in the axial direction. A shortest radial distance (H) between the inner margin wall of the cylinder portion of the valve port jacket 24D and the sealing portion 243, in cooperation with the valve core body 11 of the valve core component 10, of the valve seat core 22 is less than 2 mm. A V-shaped groove 245 is provided in the upper end portion of the valve port jacket 24D.

Since the valve port jacket 24D is higher than the upper end portion 222 of the valve seat core 22 in the axial direction, the higher portion of the valve port jacket 24D can block the instant impact of the high-pressure fluid to make the valve opening process stable, when the valve core body 11 of the valve core component 10 leaves the sealing portion 243 of the valve seat core 22 to open the valve port. Similarly, setting the shortest radial distance H between the inner margin wall of the cylinder portion of the valve port jacket 24D and the sealing portion 243 of the valve seat core 22 less than 2 mm can also reduce the instant impact of the high-pressure fluid on the valve core body 11 and make the valve opening process stable.

The upper end portion of the valve port jacket 24D is provided with the V-shaped groove 245, which is advantageous in that, the flow control requirements of the product during the valve opening process according to different systems can be met by only adjusting the shape, size and/or position of the V-shaped groove without redesigning structures of other components, so that the product can be serialized.

In conjunction with the above specific embodiments, a method for manufacturing an electric valve with a typical structure is described as follows.

Step A10: processing a metal sheet or metal tube into the cylindrical valve body 41.

The valve body 41 may be formed by drawing the metal sheet or punching/rolling/pressing the metal tube (it should be noted that, the metal sheet is processed into the cylindrical structure mainly by the drawing process, and the metal tube is processed into the cylindrical structure mainly by the punching/rolling processing. In the specific processing process, the procedures such as pressing/punching/rolling/extrusion molding and the like are combined for processing. Compared with the cutting processing of the metal, this process can reduce processing costs and material costs).

By the metal cutting method, a positioning stepped surface in cooperation with the valve seat component 20 and a positioning surface in cooperation with the valve cover 42 are machined on the outer margin of the valve body 41, respectively.

The above operations may preferably be performed by one-time clamping and positioning, so that the relative position and the positioning accuracy of each positioning stepped surface are guaranteed. After the subsequent installation by welding, the fit precision of each component can be ensured, so that the operation stability of the valve core component is good, and the reliability of the product is improved, which will not be repeated herein.

Step A20: fixedly connecting the screw nut kit 50 to the inner margin of the valve body 41 by welding; fixing the guide sleeve 61 of the valve core guiding component 60 to the inner margin of the middle cylinder portion 41b of the valve body 41 by welding, and mounting the sealing assembly to the guide sleeve 61.

Since the screw nut kit 50 and the guide sleeve 61 are welded to the valve body 41, the relative position accuracy can be guaranteed. Therefore, the relative position accuracy among the screw nut kit 50, the guide sleeve 61 and the valve body 41 is further improved. Preferably, the screw nut kit 50 and the guide sleeve 61 may be welded to the valve body 41 at a time, to avoid affecting the accuracy due to secondary heat.

Step A30: extending the screw rod of the transmission component 30 from the end portion of the upper cylinder portion 41a of the valve body 41 into the inner chamber of the valve body 41; assembling the screw nut 32 of the transmission component 30 with the valve core component 10, mounting the assembled assembly into the inner chamber of the valve body 41 from the lower cylinder portion of the valve body 41, and screwing the screw nut 32 to the screw rod 31, so that the screw nut 32 cooperates with the limiting portion of the screw nut kit 50, the guide sleeve 61 is in a clearance-fit with the valve core component 10, and the sealing assembly elastically abuts against the outer margin of the valve core component.

It will be appreciated that, since the screw nut kit 50 and the guide sleeve 61 are welded to the valve body 41, the relative position accuracy can be guaranteed. The mounting accuracy of the transmission component 30 and the valve core component 10 is relatively high, so that the valve core is driven stably.

Step A40: mounting the valve seat core 22 to the valve seat body 21, and nesting the valve port jacket 24 on the inner margin surface of the valve seat core 22, where the flange portion 244 of the valve port jacket 24 abuts against the lower stepped portion 212 of the valve seat body 21, the end portion of the axial connecting pipe 23 abuts against the flange portion 244, the axial connecting pipe 23 is fixed to the valve seat body 21 by welding, and the lower end portion of the valve body 41 abuts against the outer stepped portion 213 of the valve seat body 21 and is fixed to the outer stepped portion by welding.

Preferably, the above parts may be fixed by welding multiple parts at a time, the process is simple, and the product is highly reliable.

Step A50: fixing the valve cover 42 to the valve body 41 by welding, where the magnetic rotor of the transmission component 30 is arranged in the inner chamber of the valve cover 42 after welding;

Since the valve cover 42 and the screw nut kit are respectively welded to the valve body 41, the position accuracy thereof is relatively high, a gap between the magnetic rotor and the inner wall surface of the valve cover can be controlled to be smaller, and the structure is thereby compact.

Step A60: fixing the radial connecting pipe 43 to the lower cylinder portion 41c of the valve body 41 by welding; and Step A70: sleeving the electromagnetic coil 70 outside the outer margin of the valve cover 42, and fixing the electromagnetic coil 70 to a fixing bracket 44.

It will be appreciated by those skilled in the art that, based on the technical idea of the present application, a variety of assembly sequences and assembly changes may be obtained on the basis of the above technical solutions. For example, step A60 can be placed in the previous process without affecting the technical effect of the present application; and the sequence of step A50 and step A40 can be interchanged. These changes shall fall within the protection scope of the present application and will not be repeated herein.

The electric valve according to the present application is described in detail hereinbefore in conjunction with specific embodiments. As for the electric valve according to the present application, the design of the structure of the valve body is optimized. In the manufacturing process, the valve body is formed by drawing the metal sheet or pressing the metal tube, and other multiple functional components are fixedly connected to the upper cylinder portion, the middle cylinder portion and the lower cylinder portion of the valve body, so that the overall structure of the product is reduced, the processing of the components is easy, and the mounting is compact. The position accuracy among the functional components can also be easily guaranteed, which allows the valve core component to operate stably and improves the product reliability.

The principle and the embodiments of the present application are illustrated herein by specific examples. The above description of examples is only intended to help the understanding of the concept of the present application. It should be noted that, for the person skilled in the art, a few of improvements and modifications may be made to the present application without departing from the principle of the present application, and these modifications and improvements are also deemed to fall into the protection scope of the present application defined by the claims.

What is claimed is:

1. An electric valve, comprising:
    a valve body component, wherein, the valve body component comprises a valve body and a valve cover, and the valve cover is fixedly connected with the valve body;
    a valve core component, which is arranged in an inner chamber of the valve body;
    a transmission component; and
    a valve seat component, wherein, the valve seat component comprises a valve seat body and a valve seat core, the valve seat body is fixedly connected with the valve body, and the valve seat core is sleeved outside a valve port jacket,
    wherein the transmission component comprises a magnetic rotor, a screw rod, and a screw nut, and the screw rod is static with respect to the valve body in the axial direction;
    an upper stepped portion is provided on an inner wall of the valve seat body with a stepped surface facing an upper end portion of the valve seat body, the valve seat core is arranged on the upper stepped portion; and
    a balance passage is defined on the valve port jacket or the valve seat core.

2. The electric valve according to the claim 1, wherein the valve port jacket is a cylindrical member, and a balance aperture is arranged at a wall portion of the valve port jacket corresponding to the stepped surface of the upper stepped portion, and the balance aperture serves as the balance passage.

3. The electric valve according to the claim 1, wherein the valve port jacket is a cylindrical member, and the valve seat core is provided with a groove which is in communication with the stepped surface of the upper stepped portion, and the groove serves as the balance passage.

4. The electric valve according to the claim 1, wherein the valve port jacket is an annular member formed by crimping a metal sheet, and an axial opening groove is provided at a butt position of the crimping, and the axial opening serves as the balance passage.

5. The electric valve according to the claim 1, wherein, a lower stepped portion with a stepped surface facing a lower end portion of the valve seat body is provided on an inner wall of the valve seat body, the valve port jacket comprises a cylinder portion and a flange portion cooperating with the valve seat core, and the flange portion is configured to abut against the stepped surface of the lower stepped portion.

6. The electric valve according to the claim 5, further comprising an axial connecting pipe, wherein, an end portion of the axial connecting pipe is configured to abut against the flange portion of the valve port jacket, and the axial connecting pipe is fixed to the valve seat body by welding.

7. The electric valve according to the claim 1, wherein the valve port jacket is integrally formed with the valve seat body.

8. The electric valve according to the claim 1, wherein the valve port jacket comprises an upper end portion higher than the valve seat core in an axial direction.

9. The electric valve according to the claim 8, wherein a V-shaped or rectangular groove is provided in the upper end portion of the valve port jacket.

10. The electric valve according to the claim 1, wherein a shortest radial distance between an inner margin wall of a cylinder portion of the valve port jacket and a sealing portion, in cooperation with the valve core component, of the valve seat core is less than 2 mm.

11. The electric valve according to claim 1, wherein, the valve seat core is made of a non-metallic material.

12. The electric valve according to the claim 11, wherein an inner margin surface of the upper stepped portion of the valve seat body is a conical surface which tapers upwardly and an outer margin of the valve seat core is fixed by abutting against the conical surface.

13. The electric valve according to the claim 11, wherein a protrusion portion for fixing the valve seat core is provided on the upper end portion of the valve seat body.

14. The electric valve according to claim 1, wherein, an outer stepped portion with a stepped surface facing a lower end portion of the valve body is provided on an outer wall of the valve seat body, the lower end portion of the valve body is configured to abut against the stepped surface of the outer stepped portion, and the valve body is fixed to the valve seat body by welding.

15. The electric valve according to the claim 14, wherein, the valve body is formed by integrally rolling or drawing a metal material, and comprises an upper cylinder portion, a middle cylinder portion, and a lower cylinder portion, and a diameter of an outer margin of the upper cylinder portion is less than a diameter of an outer margin of the middle cylinder portion; and the valve cover is fixedly connected to an outer margin of the middle cylinder portion of the valve body, and the upper cylinder portion of the valve body is configured to extend into the inner chamber of the valve cover.

16. The electric valve according to the claim 15, further comprising a valve core guiding component, wherein, the valve core guiding component comprises a guide sleeve, and, the guide sleeve is fixedly connected to an inner margin of the middle cylinder portion of the valve body and is in a clearance-fit with the valve core component.

17. The electric valve according to the claim 15, wherein the magnetic rotor is arranged inside the inner chamber of the valve cover, the screw rod is extended from an upper end portion of the valve body into the inner chamber of the valve body and is threadedly connected with the screw nut, and the electric valve further comprises a screw nut kit, the screw nut kit is fixedly connected to an inner margin of the valve body, the screw nut kit comprises a first limiting portion for limiting circumferential rotation of the screw nut, and a cross-section of the first limiting portion is non-circular.

* * * * *